United States Patent
Hwang Bo et al.

(10) Patent No.: US 12,091,725 B2
(45) Date of Patent: Sep. 17, 2024

(54) METHOD OF MANUFACTURING CYLINDRICAL BATTERY CASE HAVING REDUCED SURFACE ROUGHNESS

(71) Applicant: LG Chem, Ltd., Seoul (KR)

(72) Inventors: Kwang Su Hwang Bo, Daejeon (KR); Je Jun Lee, Daejeon (KR); Sang Sok Jung, Daejeon (KR); Jun Tak Kim, Daejeon (KR); Gil Young Lee, Daejeon (KR); Seong Mo Koo, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 1370 days.

(21) Appl. No.: 16/606,613

(22) PCT Filed: Oct. 23, 2018

(86) PCT No.: PCT/KR2018/012565
§ 371 (c)(1),
(2) Date: Oct. 18, 2019

(87) PCT Pub. No.: WO2019/083254
PCT Pub. Date: May 2, 2019

(65) Prior Publication Data
US 2020/0335736 A1    Oct. 22, 2020

(30) Foreign Application Priority Data

Oct. 23, 2017 (KR) .......................... 10-2017-0137092
Oct. 23, 2018 (KR) .......................... 10-2018-0126665

(51) Int. Cl.
*C21D 9/48* (2006.01)
*B21D 22/20* (2006.01)
(Continued)

(52) U.S. Cl.
CPC ............. *C21D 9/48* (2013.01); *B21D 22/201* (2013.01); *C23C 30/005* (2013.01);
(Continued)

(58) Field of Classification Search
CPC .... C21D 9/48; H01M 50/131; H01M 50/124; H01M 50/133; H01M 50/119;
(Continued)

(56) References Cited

U.S. PATENT DOCUMENTS 6,153,027 A    11/2000  Sugikawa
6,165,640 A *  12/2000  Sugikawa ........... H01M 50/134
                                                429/166
(Continued)

FOREIGN PATENT DOCUMENTS

CN    1170782 A    1/1998
CN    1983671 A    6/2007
(Continued)

OTHER PUBLICATIONS

Extended European Search Report including Written Opinion for Application No. EP18870614 dated Jun. 12, 2020, 6 pages.
(Continued)

*Primary Examiner* — Sally A Merkling
*Assistant Examiner* — Ricardo D Morales
(74) *Attorney, Agent, or Firm* — Lerner David LLP

(57) ABSTRACT

A method of manufacturing a cylindrical battery case includes performing an ironing process, which is one of the processes of manufacturing the battery case, a plurality of times in order to decrease the surface roughness of the battery case, thereby improving the corrosion characteristics of the battery case. The surface roughness of the cylindrical battery case is decreased by performing a thickness reducing process when a process for forming the outer circumferential surface of a body of the cylindrical battery case is performed at the time of manufacturing the cylindrical battery case. In addition, corrosion characteristics are improved for respective values of the surface roughness.

5 Claims, 4 Drawing Sheets

\<COMPARATIVE EXAMPLE 1\>

\<EXAMPLE 1\>

(51) Int. Cl.
*B21D 35/00* (2006.01)
*C23C 30/00* (2006.01)
*H01M 50/119* (2021.01)
*H01M 50/124* (2021.01)
*H01M 50/131* (2021.01)
*H01M 50/133* (2021.01)

(52) U.S. Cl.
CPC ....... *H01M 50/119* (2021.01); *H01M 50/124* (2021.01); *H01M 50/131* (2021.01); *H01M 50/133* (2021.01); *B21D 35/002* (2013.01); *Y10T 29/49108* (2015.01)

(58) Field of Classification Search
CPC .... B21D 22/201; B21D 35/002; B21D 22/28; C23C 30/005; Y10T 29/49108
See application file for complete search history.

(56) References Cited

U.S. PATENT DOCUMENTS

| | | |
|---|---|---|
| 6,333,124 B1 | 12/2001 | Moriwaki et al. |
| 6,929,880 B1 | 8/2005 | Mori et al. |
| 2006/0083981 A1 | 4/2006 | Mori et al. |
| 2009/0269661 A1 | 10/2009 | Mori et al. |
| 2010/0116014 A1 | 5/2010 | Goda et al. |
| 2012/0305557 A1 | 12/2012 | Riley et al. |
| 2016/0248071 A1 | 8/2016 | Jang et al. |
| 2017/0117507 A1 | 4/2017 | Kong |

FOREIGN PATENT DOCUMENTS

| | | | | |
|---|---|---|---|---|
| CN | 102725079 A | 10/2012 | | |
| CN | 104942117 A | 9/2015 | | |
| EP | 809307 A2 * | 11/1997 | ............ | B21D 22/21 |
| JP | H05162733 A | 6/1993 | | |
| JP | H08321286 A | 12/1996 | | |
| JP | H1083800 A | 3/1998 | | |
| JP | H111779 A | 1/1999 | | |
| JP | 2000011966 A | 1/2000 | | |
| JP | 2000021361 A | 1/2000 | | |
| JP | 3105785 B2 | 11/2000 | | |
| JP | 2001155698 A | 6/2001 | | |
| JP | 2002015712 A | 1/2002 | | |
| JP | 2003263974 A | 9/2003 | | |
| JP | 2005078894 A | 3/2005 | | |
| JP | 4119612 B2 | 7/2008 | | |
| JP | 2008311198 A | 12/2008 | | |
| JP | 200937680 A | 2/2009 | | |
| JP | 2009037980 A | 2/2009 | | |
| JP | 2009113058 A | 5/2009 | | |
| JP | 2015197964 A * | 11/2015 | ............ | B21D 22/26 |
| JP | 5975573 B2 | 8/2016 | | |
| JP | 2016536770 A | 11/2016 | | |
| KR | 20050113664 A | 12/2005 | | |
| KR | 20100097262 A | 9/2010 | | |
| KR | 101621253 B1 | 5/2016 | | |
| KR | 101643091 B1 | 7/2016 | | |
| KR | 20170028422 A | 3/2017 | | |
| WO | 2006137403 A1 | 12/2006 | | |
| WO | 2019083254 A1 | 5/2019 | | |

OTHER PUBLICATIONS

Search Report for Chinese Application No. 201880024824.9 dated Aug. 27, 2021. 3 pgs.
Wang Yun, "Pro/ENGINEER Wildfire 5.0 Tutorial for Design of Stamping Dies", National Defense Industry Press, (Feb. 29, 2012). 13 pgs.
Yoshikata. "Latest Machinery Manufacturing" Edited by the Research Society of Machinery Manufacturing Methods, published by: Beijing National Defense Industry Press, Jun. 1988, ISBN: 7-118-001748-3/TH11. 4 pages.
Search Report dated Nov. 24, 2022 from the Office Action for Chinese Application No. 201880024824.9 issued Dec. 5, 2022, pp. 1-2. [See p. 2, categorizing the cited references].
International Search Report from Application No. PCT/KR2018/012565 mailed Jan. 23, 2019, pp. 1-2.
Wang. S. "Design and Manufacture of Real Dies" Apr. 1991, pp. 115-119. ISBN7-81024-145-1/TG.1.
Search Report dated Jul. 29, 2022 from the Office Action for Chinese Application No. 201880024824.9 issued Aug. 9, 2022, pp. 1-2.
Search Report dated Apr. 2, 2022 from the Office Action for Chinese Application No. 201880024824.9 issued Apr. 14, 2022, 2 pages. [See p. 1, categorizing the cited references].

* cited by examiner

[FIG. 1]
[FIG. 2]
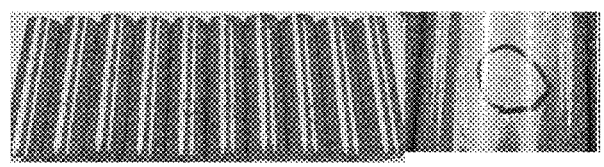

[FIG. 3]
<COMPARATIVE EXAMPLE 1>
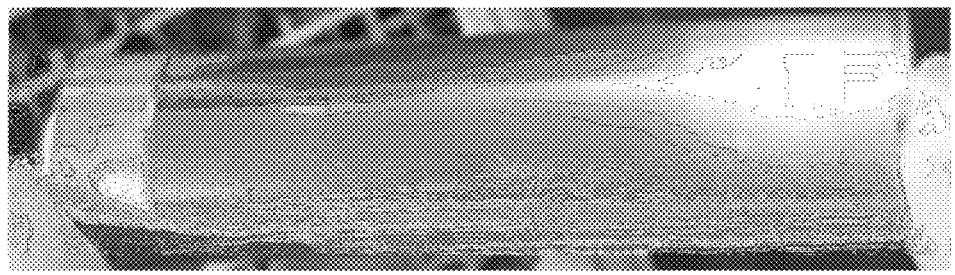
<EXAMPLE 1>

[FIG. 4]
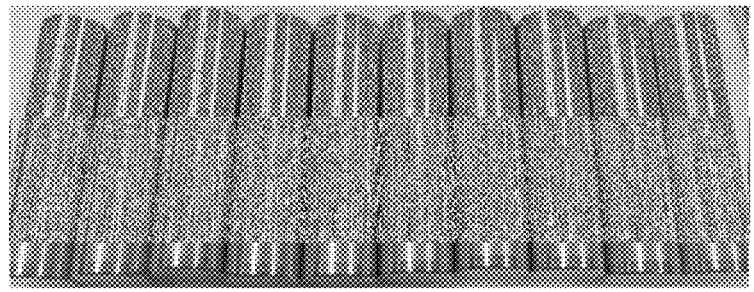
<COMPARATIVE EXAMPLE 1>
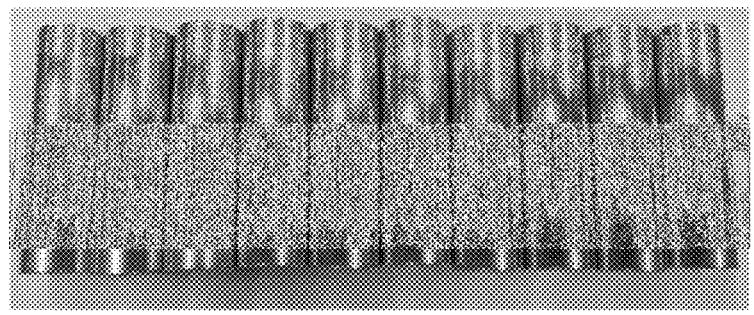
<EXAMPLE 1>

[FIG. 5]

| CLASSIFICATION | EXAMPLE 1 (0.08mm ironing) | | COMPARATIVE EXAMPLE 2 (0.15mm ironing) | | COMPARATIVE EXAMPLE 3 (0.05mm ironing) | |
|---|---|---|---|---|---|---|
| | Ra | Rz | Ra | Rz | Ra | Rz |
| 1 | 0.029μm | 0.174μm | 0.109μm | 0.699μm | 0.276μm | 1.794μm |
| 2 | 0.026μm | 0.159μm | 0.124μm | 0.779μm | 0.189μm | 0.924μm |
| 3 | 0.033μm | 0.181μm | 0.142μm | 0.684μm | 0.271μm | 2.003μm |
| 4 | 0.027μm | 0.183μm | 0.136μm | 0.779μm | 0.277μm | 2.436μm |
| 5 | 0.034μm | 0.203μm | 0.113μm | 0.667μm | 0.192μm | 1.005μm |
| 6 | 0.028μm | 0.173μm | 0.123μm | 0.944μm | 0.216μm | 1.224μm |
| 7 | 0.034μm | 0.251μm | 0.115μm | 0.653μm | 0.267μm | 1.543μm |
| 8 | 0.026μm | 0.156μm | 0.100μm | 0.542μm | 0.249μm | 1.41μm |
| 9 | 0.025μm | 0.173μm | 0.105μm | 0.622μm | 0.21μm | 1.352μm |
| 10 | 0.030μm | 0.245μm | 0.111μm | 0.684μm | 0.217μm | 1.451μm |
| 11 | 0.026μm | 0.166μm | 0.114μm | 0.734μm | 0.243μm | 1.703μm |
| 12 | 0.022μm | 0.146μm | 0.104μm | 0.681μm | 0.282μm | 1.651μm |
| 13 | 0.026μm | 0.166μm | 0.115μm | 0.660μm | 0.199μm | 1.124μm |
| 14 | 0.032μm | 0.203μm | 0.133μm | 0.785μm | 0.238μm | 1.699μm |
| 15 | 0.040μm | 0.233μm | 0.123μm | 0.768μm | 0.203μm | 1.121μm |
| 16 | 0.024μm | 0.152μm | 0.099μm | 0.612μm | 0.309μm | 1.989μm |
| 17 | 0.039μm | 0.248μm | 0.112μm | 0.769μm | 0.179μm | 1.414μm |
| 18 | 0.034μm | 0.427μm | 0.107μm | 0.670μm | 0.224μm | 1.473μm |
| 19 | 0.031μm | 0.221μm | 0.102μm | 0.622μm | 0.253μm | 1.412μm |
| 20 | 0.028μm | 0.172μm | 0.118μm | 0.702μm | 0.219μm | 1.22μm |
| AVERAGE | 0.030μm | 0.202μm | 0.115μm | 0.713μm | 0.236μm | 1.497μm |

METHOD OF MANUFACTURING CYLINDRICAL BATTERY CASE HAVING REDUCED SURFACE ROUGHNESS

CROSS-REFERENCE TO RELATED APPLICATIONS

This application is a national phase entry under 35 U.S.C. § 371 of International Application No. PCT/KR2018/012565 filed Oct. 23, 2018, which claims priority from Korean Patent Application No. 10-2017-0137092 filed on Oct. 23, 2017 and Korean Patent Application No. 10-2018-0126665 filed on Oct. 23, 2018, the disclosures of all of which are incorporated herein by reference in their entirety.

TECHNICAL FIELD

The present invention relates to a method of manufacturing a cylindrical battery case, and more particularly to a method of manufacturing a cylindrical battery case that is capable of performing an ironing process, which is one of the processes of manufacturing the battery case, a plurality of times in order to decrease the surface roughness of the battery case, thereby improving the corrosion characteristics of the battery case.

BACKGROUND ART

In general, there are various kinds of secondary batteries, such as a nickel cadmium battery, a nickel hydride battery, a lithium ion battery, and a lithium ion polymer battery. Such secondary batteries have come to be used in large-sized products that require high output, such as an electric vehicle and a hybrid vehicle, a power storage apparatus for storing surplus power or new and renewable energy, and a backup power storage apparatus, as well as small-sized products, such as a digital camera, a portable digital versatile disc (DVD) player, an MP3 player, a cellular phone, a personal digital assistant (PDA), a portable game device, a power tool, and an electric bicycle (E-bike).

A lithium secondary battery generally includes a positive electrode (cathode), a separator, and a negative electrode (anode), the materials for which are selected in consideration of the lifespan, the charging and discharging capacities, the temperature characteristics, and the stability of the battery.

Based on the shape of a battery case, secondary batteries are classified into a cylindrical battery, configured to include a cylindrical case, a prismatic battery, configured to include a prismatic case, and a pouch-shaped battery, configured to include a case made of a thin laminate sheet.

Meanwhile, an electrode assembly, which is a power-generating element configured to have a structure in which a positive electrode, a separator, and a negative electrode are stacked and configured so as to be capable of being charged and discharged, is mounted in the battery case. The electrode assembly is classified as a jelly-roll type electrode assembly, which is configured to have a structure in which a long sheet type positive electrode and a long sheet type negative electrode, to which active materials are applied, are wound in the state in which a separator is interposed between the positive electrode and the negative electrode, or a stacked type electrode assembly, which is configured to have a structure in which a plurality of positive electrodes having a predetermined size and a plurality of negative electrodes having a predetermined size are sequentially stacked in the state in which separators are interposed respectively between the positive electrodes and the negative electrodes.

Among these electrode assemblies, the jelly-roll type electrode assembly is widely manufactured, since the jelly-roll type electrode assembly is easy to manufacture, has high energy density per unit weight, and can be easily received in a cylindrical battery case.

Such a cylindrical battery case is generally manufactured as follows. First, a band-type metal battery case material made of a nickel-plated steel sheet is punched in order to form a disk-shaped board corresponding to a desired cylindrical battery case, and a deep-drawing process is performed with respect to the board in order to form a dish-shaped first intermediate cup body. An additional deep-drawing process is performed with respect to the first intermediate cup body in order to form a second intermediate cup body resembling the desired cylindrical battery case. Finally, drawing and ironing processes are performed with respect to the second intermediate cup body in order to form the desired cylindrical battery case.

A conventional cylindrical battery case is made of a steel sheet manufactured by plating low-carbon steel with Ni. The Ni layer serves as a protective layer for protecting the Fe layer. This structure is shown in FIG. 1.

When manufacturing the cylindrical battery case, the outer circumferential surface of a cylindrical body of the battery case is formed through a drawing process. As a result, the surface roughness of the surface of the battery case is increased to a specific level or higher due to drawing tensile force, whereby the surface of the cylindrical battery case is poorly polished.

In addition, various kinds of spot corrosion are observed on the outer circumferential surface of the body of the circumferential battery case as the result of tests on corrosion resistance. The spot corrosion observed on the outer circumferential surface of the body of the circumferential battery case is shown in FIG. 2.

There have been no attempts to reduce the surface roughness of a cylindrical secondary battery, thereby improving the corrosion resistance of the cylindrical secondary battery and thus improving the corrosion characteristics of the cylindrical secondary battery.

Meanwhile, Japanese Patent Application Publication No. 2002-015712 discloses a battery case configured to have a structure in which an ironing process is performed using multi-stage ironing dies such that the thickness $t_1$ of the wall of the battery case and the thickness $t_0$ of the bottom of the battery case satisfy the following equation $t_1=\alpha t_0$ ($\alpha=0.2$ to $0.7$) and in which a drawing process is performed with respect to the inner circumferential surface of the wall of the battery case after the ironing process is performed such that the inner circumferential surface of the wall of the battery case has an average surface roughness of 0.2 μm to 2.0 μm. However, this publication does not disclose technology that is capable of improving the corrosion resistance of the battery case by reducing the surface roughness of the battery case.

Japanese Patent Application Publication No. 2003-263974 discloses a method of manufacturing a cylindrical metal can having a circular cross-sectional shape including a board punching process for punching a metal can material made of a band-type metal sheet in order to form a hexagonal board, a first cup forming process for forming the board into a first intermediate cup body having the cross-sectional shape of a hexagon, a process for drawing the first intermediate cup body, and an ironing process, wherein the drawing process and the ironing process are successively performed (DI processes). This publication corresponds somewhat to the present invention; however, this publication does not disclose technology that is capable of improving the corrosion resistance of the battery case by reducing the surface roughness of the battery case.

Japanese Registered Patent No. 4119612 discloses a prismatic battery can configured to receive a power-generating element, configured to constitute a prismatic battery, and configured to have the cross-sectional shape of an appropriate rectangle, wherein the thickness of the short side of the rectangular battery case is greater than the thickness of the long side of the rectangular battery case. However, this patent does not disclose technology that is capable of improving the corrosion resistance of the battery case by reducing the surface roughness of the battery case.

Japanese Patent Application Publication No. 2009-037980 discloses a method of successively performing a one-stage drawing process and a three-stage ironing process with respect to the intermediate cup body using a drawing and ironing machine. However, this publication does not disclose technology that is capable of improving the corrosion resistance of the battery case by reducing the surface roughness of the battery case.

That is, a method of manufacturing a cylindrical battery case that is capable of performing an ironing process, which is one of the processes of manufacturing the battery case, a plurality of times in order to decrease the surface roughness of the battery case, thereby improving the corrosion characteristics of the battery case, has not yet been suggested.

DISCLOSURE

Technical Problem

The present invention has been made in view of the above problems and other technical problems that have yet to be resolved.

The inventors of the present application have conducted a variety of extensive and intensive studies and experiments to solve the problems described above. It is an object of the present invention to provide a method of manufacturing a cylindrical battery case that is capable of solving a problem of relatively low resistance to corrosion of a battery for electric vehicles and improving the corrosion resistance of the cylindrical battery case.

It is another object of the present invention to provide a method of manufacturing a cylindrical battery case that enables adjustments of the surface roughness of the cylindrical battery case in order to improve the corrosion resistance of the cylindrical battery case.

It is a further object of the present invention to provide a method of manufacturing a cylindrical battery case that is capable of performing an improved deep-drawing process in order to improve the corrosion resistance of the cylindrical battery case.

Technical Solution

In accordance with an aspect of the present invention, the above and other objects can be accomplished by the provision of a method of manufacturing a cylindrical battery case, wherein an ironing process is performed a plurality of times at the time of performing a deep-drawing process for forming the outer circumferential surface of a body of the battery case.

A primary ironing process may be performed at the time of performing a deep-drawing process for forming the body of the battery case, and a secondary ironing process may be performed at the time of performing a deep-drawing process for forming a step portion at the battery case.

The surface roughness (Ra) of the battery case after the ironing process may be 0.1 μm or less.

The reduction in the thickness of the battery case may be uniform after the ironing process is performed the plurality of times.

In accordance with another aspect of the present invention, there is provided a method of manufacturing a cylindrical battery case, the method including a first step of forming a nickel coating layer on at least one surface of a steel sheet, a second step of thermally treating the steel sheet subjected to the first step in a reducing atmosphere, a third step of blanking and drawing the steel sheet subjected to the second step, a fourth step of performing a primary deep-drawing process and a primary ironing process with respect to the steel sheet subjected to the third step in order to form a body of a battery case, a fifth step of performing a secondary deep-drawing process with respect to the steel sheet subjected to the fourth step in order to form the body of the battery case, a sixth step of performing a tertiary deep-drawing process and a secondary ironing process with respect to the body of the battery case subjected to the fifth step in order to form a step portion at the body of the battery case, and a seventh step of forming a taper and a flange at the body of the battery case subjected to the sixth step.

The surface roughness (Ra) of the battery case after the primary ironing process may be 0.2 μm or less.

The surface roughness (Ra) of the battery case after the secondary ironing process may be 0.1 μm or less.

In accordance with another aspect of the present invention, there is provided a secondary battery including a battery case manufactured using the method of manufacturing the cylindrical battery case.

In accordance with a further aspect of the present invention, there is provided a device including the secondary battery.

The device may be selected from the group consisting of an electronic device, an electric vehicle, a hybrid electric vehicle, and a power storage system.

BRIEF DESCRIPTION OF DRAWINGS

FIG. 1 is a conceptual view showing a nickel coating layer of a conventional cylindrical secondary battery.

FIG. 2 is a view showing the results of experiments on the corrosion resistance of the conventional cylindrical secondary battery.

FIG. 3 is a photograph showing the external appearances of cylindrical battery cases according to Example 1 and Comparative Example 1.

FIG. 4 is a photograph showing the results of tests on the corrosion of the cylindrical battery cases according to Example 1 and Comparative Example 1.

FIG. 5 is a view showing the surface roughness (Ra, Rz) of cylindrical battery cases according to Example 1, Comparative Example 2, and Comparative Example 3.

BEST MODE

Now, preferred embodiments of the present invention will be described in detail with reference to the accompanying drawings such that the preferred embodiments of the present invention can be easily implemented by a person having ordinary skill in the art to which the present invention pertains. In describing the principle of operation of the preferred embodiments of the present invention in detail, however, a detailed description of known functions and configurations incorporated herein will be omitted when the same may obscure the subject matter of the present invention.

Wherever possible, the same reference numbers will be used throughout the drawings to refer to parts that perform similar functions or operations. Meanwhile, in the case in which one part is 'connected' to another part in the following description of the present invention, not only may the one part be directly connected to the another part, but also, the one part may be indirectly connected to the another part via a further part. In addition, that a certain element is 'included' means that other elements are not excluded, but may be further included, unless mentioned otherwise.

Reference will now be made in detail to the preferred embodiments of the present invention, examples of which are illustrated in the accompanying drawings.

FIG. 1 is a conceptual view showing a nickel coating layer of a conventional cylindrical secondary battery.

As shown in FIG. 1, a cylindrical secondary battery case is made of a steel sheet having a nickel coating layer formed thereon, i.e. a nickel-plated steel sheet.

The nickel-plated steel sheet is mainly used as the material for a battery case in which potassium hydroxide, which is strong alkaline, is used as an electrolytic solution, as in an alkaline dry cell or a nickel cadmium storage cell. The nickel coating layer exhibits high resistance to alkaline materials, exhibits stable contact resistance when a battery is connected to an external terminal, and exhibits high spot weldability at the time of assembling the battery.

FIG. 2 is a view showing the results of experiments on the corrosion resistance of the conventional cylindrical secondary battery.

Tests on the corrosion resistance of a cylindrical secondary battery case are performed under high-temperature and high-humidity conditions. The cylindrical secondary battery case was maintained at a temperature of 60° C. and a humidity of 95% RH in order to observe spot corrosion on the surface of the cylindrical secondary battery case.

As the results of the tests, spot corrosion was observed on the surface of the cylindrical secondary battery case. Spot corrosion was observed at one or more positions on the surfaces of 50 to 100% of the total number of samples of the cylindrical secondary battery case.

A conventional process for manufacturing a battery case of a cylindrical secondary battery may include a step of blanking and drawing a nickel-plated base material (#1) and a step of idling the base material. In addition, the conventional process for manufacturing the battery case of the cylindrical secondary battery may further include a step of drawing the base material in order to form the battery case (wherein a drawing process is performed four times) (#4 to #7), a step of drawing and body-ironing the base material (#8), a step of drawing the base material (#9), a step of step-drawing the base material (#10), a step of forming a taper and a flange at the base material (#11), a step of forming a vent in the base material (#12), and a step of trimming the base material (#13).

A non-tubing model of a secondary battery for electric vehicles (EVs) may have relatively low resistance to corrosion. In particular, electric vehicle manufacturers who use secondary batteries, such as Tesla, require only secondary batteries that satisfy corrosion conditions of 60° C., 95% RH, and 7 days after being put in a high-temperature and high-humidity environment. In order to improve corrosion resistance, therefore, an ironing process, which is a method that is capable of highly polishing the surface of a battery case, is performed.

The surface roughness of a battery case of a cylindrical secondary battery causes a potential difference in metal, whereby an environment in which local corrosion readily occurs is formed. In the case in which the value of surface roughness Ra is reduced, therefore, the surface area of the battery case may be reduced, whereby the corrosion resistance of the battery case may be improved.

At the time of deep-drawing the battery case of the cylindrical secondary battery, the ironing process is performed two times. At this time, the final ironing process is performed after the drawing process in order to increase the degree of polish.

In the case in which the drawing process is performed, the roughness of the battery case is increased and the polish disappears from the battery case due to the tensile force generated at the side surface of the battery case. In the case in which the ironing process is performed, the thickness of the battery case is decreased and becomes uniform, since the ironing process is performed while pushing the battery case upwards. Consequently, the roughness of the battery case may be decreased and the battery case may be polished due to compressive friction with a die. That is, the surface roughness of the battery case may be decreased as the extent of ironing of the battery case is increased.

The present invention provides a method of manufacturing a cylindrical battery case characterized in that an ironing process is performed a plurality of times at the time of performing a deep-drawing process for forming the outer circumferential surface of a body of the battery case.

In addition, a primary ironing process may be performed at the time of performing a deep-drawing process for forming the body of the battery case, and a secondary ironing process may be performed at the time of performing a deep-drawing process for forming a step portion of the battery case.

In addition, the surface roughness Ra of the battery case after the ironing process may be 0.1 µm or less.

In addition, a reduction in the thickness of the battery case may be uniform after the ironing process is performed the plurality of times.

It is assumed that, when the ironing process is performed once with respect to the body of the battery case at the deep-drawing step, the thickness of the battery case is reduced by 0.08 mm. In the case in which the ironing process is performed twice, the thickness of the battery case is reduced by 0.04 mm every time the ironing process is performed. Eventually, therefore, the thickness of the battery case is reduced by 0.08 mm.

That is, the reduction in the thickness of the battery case may be uniform irrespective of whether the ironing process is performed only once or a plurality of times.

To this end, the present invention may provide a method of manufacturing a cylindrical battery case including a first step of forming a nickel coating layer on at least one surface of a steel sheet, a second step of thermally treating the steel sheet subjected to the first step in a reducing atmosphere, a third step of blanking and drawing the steel sheet subjected to the second step, a fourth step of performing a primary deep-drawing process and a primary ironing process with respect to the steel sheet subjected to the third step in order to form a body of a battery case, a fifth step of performing a secondary deep-drawing process with respect to the steel sheet subjected to the fourth step in order to form the body of the battery case, a sixth step of performing a tertiary deep-drawing process and a secondary ironing process with respect to the body of the battery case subjected to the fifth step in order to form a step portion of the body of the battery case, and a seventh step of forming a taper and a flange on the body of the battery case subjected to the sixth step.

The method of manufacturing the cylindrical battery case may further include a step of forming a vent in the body of the battery case subjected to the seventh step.

The method of manufacturing the cylindrical battery case may further include a step of trimming the body of the battery case subjected to the seventh step.

In addition, the surface roughness Ra of the battery case after the primary ironing process may be 0.2 μm or less.

In addition, the surface roughness Ra of the battery case after the secondary ironing process may be 0.1 μm or less.

In addition, the present invention may provide a secondary battery including a battery case manufactured using the method of manufacturing the cylindrical battery case.

In addition, the present invention may provide a device including the secondary battery.

The device may be one selected from the group consisting of an electronic device, an electric vehicle, a hybrid electric vehicle, and a power storage system.

Hereinafter, the present invention will be described with reference to the following example. This example is provided only for illustration of the present invention and should not be construed as limiting the scope of the present invention.

EXAMPLE 1

In order to manufacture a cylindrical secondary battery according to the present invention, a step of blanking and drawing a nickel-plated base material (#1) and a step of idling the base material may be performed. A cylindrical battery case was manufactured through a step of drawing the base material in order to form the battery case (wherein a drawing process was performed four times) (#4 to #7), a step of drawing and body-ironing the base material (#8), a step of drawing the base material (#9), a step of step-drawing and body-ironing the base material (#10), a step of forming a taper and a flange on the base material (#11), a step of forming a vent in the base material (#12), and a step of trimming the base material (#13).

Specifically, the ironing process at step #8 was performed in order to reduce the thickness of the base material by 0.04 mm, and the ironing process at step #10 was performed in order to reduce the thickness of the base material by 0.04 mm.

COMPARATIVE EXAMPLE 1

A cylindrical battery case was manufactured through the same procedure as in Example 1, except that the ironing process at step #8 was performed in order to reduce the thickness of the base material by 0.08 mm, and the body-ironing process at step #10 was omitted.

Referring to FIG. 3, showing the resulting external appearances of the cylindrical battery case manufactured as described above, it can be seen that the surface polish of the cylindrical battery case manufactured according to Example 1 is remarkably higher than the surface polish of the cylindrical battery case manufactured according to Comparative Example 1.

EXPERIMENTAL EXAMPLE 1

Tests on corrosion resistance were performed with respect to the cylindrical battery cases manufactured according to Example 1 and Comparative Example 1.

Tests on the corrosion resistance of the cylindrical secondary battery cases were performed under high-temperature and high-humidity conditions. Specifically, the cylindrical battery cases were maintained at a temperature of 60° C. and a humidity of 95% RH for 7 days, and the external appearances of the cylindrical battery cases were photographed in order to determine whether the surfaces of the cylindrical battery cases were corroded. The results of tests on the corrosion of the cylindrical battery cases are shown in the photograph of FIG. 4.

Referring to FIG. 4, it can be seen that the cylindrical battery case manufactured according to Example 1 was not corroded but that spot corrosion was observed on the surface of the cylindrical battery case manufactured according to Comparative Example 1.

COMPARATIVE EXAMPLE 2

A cylindrical battery case was manufactured through the same procedure as in Comparative Example 1, except that the ironing process at step #8 was performed so as to reduce the thickness of the base material by 0.15 mm.

COMPARATIVE EXAMPLE 3

A cylindrical battery case was manufactured through the same procedure as in Comparative Example 1, except that the ironing process at step #8 was performed so as to reduce the thickness of the base material by 0.05 mm.

EXPERIMENTAL EXAMPLE 2

The surface roughness of the cylindrical battery cases manufactured according to Example 1, Comparative Example 2, and Comparative Example 3 was measured using a surface roughness measuring instrument SJ-411 from Mitutoyo Company. Ra and Rz were measured as the surface roughness, and the 4 mm section of the middle portion of each of the cylindrical battery cases was measured in the height direction (the vertical direction) thereof. The surface roughness of the cylindrical battery cases was measured based on ISO 4287:1997.

The results of measurement of the surface roughness of the cylindrical battery cases are shown in the table of FIG. 5.

Referring to FIG. 5, the minimum value, the maximum value, and the average value of the surface roughness Ra of the cylindrical battery case manufactured according to Example 1 were 0.022, 0.040, and 0.03, respectively, and the minimum value, the maximum value, and the average value of the surface roughness Ra of the cylindrical battery case manufactured according to Comparative Example 2 were 0.099, 0.142, and 0.115, respectively. The minimum value, the maximum value, and the average value of the surface roughness Ra of the cylindrical battery case manufactured according to Comparative Example 3 were 0.179, 0.309, and 0.236, respectively.

The minimum value, the maximum value, and the average value of the surface roughness Rz of the cylindrical battery case manufactured according to Example 1 were 0.152, 0.427, and 0.202, respectively, and the minimum value, the maximum value, and the average value of the surface roughness Rz of the cylindrical battery case manufactured according to Comparative Example 2 were 0.542, 0.944, and 0.713, respectively. The minimum value, the maximum value, and the average value of the surface roughness Rz of the cylindrical battery case manufactured according to Comparative Example 3 were 0.924, 2.436, and 1.497, respectively.

Consequently, it can be seen that the surface roughness of the cylindrical battery case manufactured according to Example 1 is decreased, and therefore it is possible to sufficiently expect an improvement in the corrosion resistance of the cylindrical battery case manufactured according to Example 1 due to the decrease in the surface roughness thereof.

Those skilled in the art to which the present invention pertains will appreciate that various applications and modifications are possible based on the above description, without departing from the scope of the present invention.

INDUSTRIAL APPLICABILITY

As is apparent from the above description, a method of manufacturing a cylindrical battery case having reduced surface roughness according to the present invention has the effect of reducing the surface roughness of the cylindrical battery case by performing a thickness reducing process when a process for forming the outer circumferential surface of a body of the cylindrical battery case is performed at the time of manufacturing the cylindrical battery case.

In addition, the method of manufacturing the cylindrical battery case according to the present invention has the effect of improving corrosion characteristics for respective values of the surface roughness.

In addition, a sufficiently coarse surface is formed on the inside of the wall of the cylindrical battery case, and therefore the area of contact between an electrode mixture or an electrode active material, which is received in the cylindrical battery case, and the inner surface of the wall of the cylindrical battery case is increased, whereby it is possible to greatly reduce the internal resistance of a battery.

In addition, in the case in which a conductive agent such as carbon is applied to the inner surface of the wall of the cylindrical battery case, the force of supporting the conductive agent is increased, whereby it is possible to maintain desirable battery characteristics even upon storage for a long time.

In addition, as a result of performing the ironing process, the thickness of the wall of the cylindrical battery case is smaller than the thickness of the bottom of the cylindrical battery case, whereby it is possible to increase the amount of the electrode mixture or the electrode active material with which the cylindrical battery case is filled and thus to improve the performance of the battery, such as the charging and discharging characteristics of the battery.

The invention claimed is:

1. A method of manufacturing a cylindrical battery case, comprising: performing an ironing process a plurality of times when performing a deep-drawing process for forming an outer circumferential surface of a body of the battery case,
   wherein performing the ironing process a plurality of times comprises:
   performing a primary ironing process when performing a deep-drawing process for forming the body of the battery case, and
   performing a secondary ironing process when performing a deep-drawing process for forming a step portion at the battery case, and
   wherein a thickness of the battery case is reduced by the same amount during each of the plurality of times the ironing process is performed.

2. The method according to claim 1, wherein a surface roughness (Ra) of the battery case after the ironing process is 0.1 microns or less.

3. A method of manufacturing a cylindrical battery case, the method comprising:
   a first step of forming a nickel coating layer on at least one surface of a steel sheet;
   after the first step, a second step of thermally treating the steel sheet in a reducing atmosphere;
   after the second step, a third step of blanking and drawing the steel sheet;
   after the third step, a fourth step of performing a primary deep-drawing process and a primary ironing process with respect to the steel sheet in order to form a body of a battery case;
   after the fourth step, a fifth step of performing a secondary deep-drawing process with respect to the steel sheet in order to form the body of the battery case;
   after the fifth step, a sixth step of performing a tertiary deep-drawing process and a secondary ironing process with respect to the body of the battery case in order to form a step portion of the body of the battery case; and
   after the sixth step, a seventh step of forming a taper and a flange on the body of the battery case.

4. The method according to claim 3, wherein a surface roughness (Ra) of the battery case after the primary ironing process is 0.2 microns or less.

5. The method according to claim 3, wherein a surface roughness (Ra) of the battery case after the secondary ironing process is 0.1 microns or less.

* * * * *